Patented May 26, 1925.

1,539,295

UNITED STATES PATENT OFFICE.

FREDERICK H. BROWN, OF LAS VEGAS, NEVADA.

COMPOSITION FOR SUBIRRIGATION PIPES AND FILTERING VESSELS.

No Drawing. Application filed July 22, 1920, Serial No. 398,302. Renewed March 10, 1925.

*To all whom it may concern:*

Be it known that I, FREDERICK H. BROWN, of Las Vegas, in the county of Clark, State of Nevada, have invented a certain new and useful Composition for Subirrigation Pipes and Filtering Vessels.

My invention relates to a composition of matter to be used in the manufacture of irrigation pipes, water filters and the like, and a certain method of manufacturing irrigation pipe and water filters and the objects of my invention are: First, to provide a novel plastic compound which is porous adapting it for use for sub-irrigation and filtering purposes; second, to provide a composition of this class which, when cured, provides a porous substance adapted for sub-irrigation pipes and water filters and the like; third, to provide a composition of matter that when mixed together and permitted to stand, certain portions will deteriorate, leaving the space occupied by the same open or porous in form; fourth, to provide a novel method of making porous pipe or filtering substance; fifth, to provide a method which is economical of production; sixth, to provide a composition of this class which is very simple and economical of production, efficient in its action and which will not readily deteriorate or get out of order.

With these and other objects in view as will appear hereinafter my invention consists of the certain novel method and composition as will be hereinafter described in detail and particularly set forth in the appended claims.

My invention consists in preparing a composition which is composed principally of earth and vegetable matter as follows: earth, four parts. (This earth consists of silica (insoluble) thirty-eight and forty one hundredths parts, alumina iron oxide, two and eighty hundredths parts, calcium sulphate, one and seventeen hundredths parts calcium carbonate, thirty-three and forty-two one hundredths parts, magnesium carbonate, one and nineteen hundredths parts, sodium carbonate, two and eighty-nine one hundredths parts, moisture, ten and thirteen one hundredths parts), cement two parts, ground fresh vegetable matter, one part. (This ground, fresh vegetable matter may be any vegetable matter, I prefer roots such as potatoes, turnips and the like,) and charcoal three to five percent in bulk.

These ingredients are prepared as follows: The earth, cement and charcoal are thoroughly mixed and agitated together in their dry form; then the ground vegetable matter is added together with enough lime water to make the composition damp enough to stick together forming an adhesive mass; then this adhesive mass is formed into the form to be used either pipe form or filter form. If formed over any object the form may be removed while green but the mass should stand from three to four weeks to thoroughly harden and cure before it is ready for use.

Sub-irrigation pipes made from the foregoing materials as specified are very porous, permitting water to quickly seep and penetrate through walls thereof in all directions without softening, deteriorating or otherwise affecting the pipe and it has been found in practice that water carrying a great deal of sediment will pass through the walls without clogging or materially affecting the porosity of said pipe.

Having thus described my invention what I claim as new and desire to secure by Letters Patent is:

1. A plastic composition for the purpose described, consisting of a material analyzing substantially insoluble silica, thirty-eight per cent; aluminum and iron oxides, three per cent; calcium carbonate, thirty-three per cent; calcium sulphate, one per cent, magnesium carbonate, one per cent; sodium carbonate, three per cent; moisture, ten per cent, of which is taken four parts; cement, two parts; vegetable matter, one part, and charcoal, five per cent of the bulk.

2. A plastic composition for the purpose described, consisting of earth, four parts; cement, two parts; vegetable matter, one part, and charcoal, five per cent of the bulk.

FREDERICK H. BROWN.

Witnesses:
 Mrs. MARTA C. BROWN,
 MARGRET A. HAULEY.